Jan. 12, 1926.                                                                  1,569,297
T. H. PHILLIPS
CATTLE YOKE
Filed Oct. 25, 1922
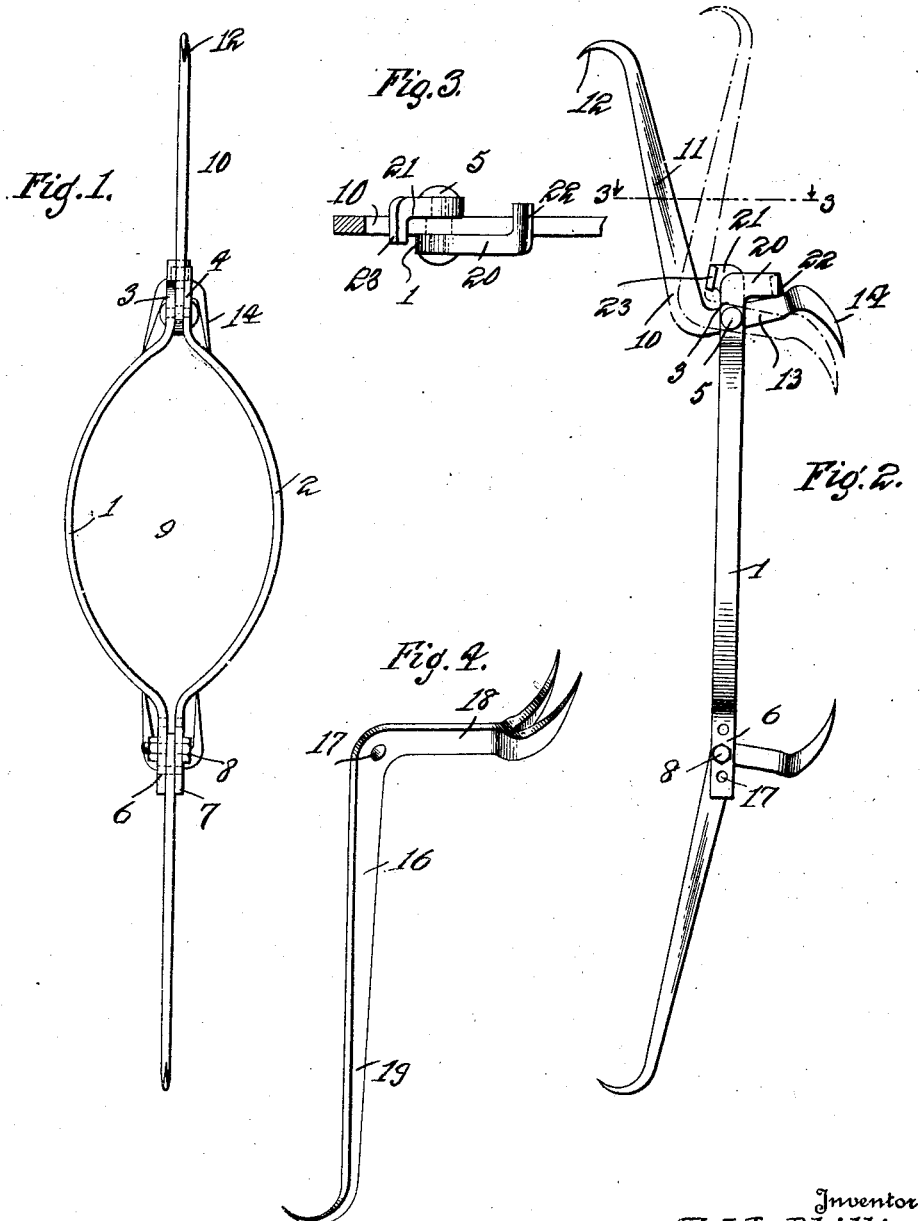
Inventor
T. H. Phillips
By Richard P. Oliver,
Attorney
Witnesses Patented Jan. 12, 1926.

1,569,297

UNITED STATES PATENT OFFICE.

TED H. PHILLIPS, OF GOULD, OKLAHOMA.

CATTLE YOKE.

Application filed October 25, 1922. Serial No. 596,915.

*To all whom it may concern:*

Be it known that I, TED H. PHILLIPS, a citizen of the United States, residing at Gould, in the county of Harmon and State of Oklahoma, have invented certain new and useful Improvements in Cattle Yokes, of which the following is a specification.

This invention relates to new and useful improvements in animal pokes and has for its principal object to provide two yoke sections, which are adapted to encircle the neck of the animal and which is further provided with means for pricking or prodding an animal should it attempt to break through a wire fence or other suitable barrier.

Another object of this invention is to provide an animal poke of the above mentioned character, which is simple in construction, efficient in operation, strong and durable.

A still further object of the invention is to provide an animal poke of the above mentioned character, which may be readily placed upon a cow or other animal for the purpose indicated and which will not prevent the animal from grazing, but will prevent the animal from breaking through fences or the like.

Other objects and advantages of the invention will become apparent during the course of the following description.

In the accompanying drawings, wherein like numerals designate like parts throughout the several views, Figure 1 is a front elevation of an animal poke constructed in accordance wth this invention, Figure 2 is a side elevation of the same, Figure 3 is a plan view taken on line 3—3 of Fig. 2, and Figure 4 is a perspective view of one of the angle bars provided with a hook member at one end and the tongs at the other end.

In the drawings, wherein for the purpose of illustration is shown the preferred embodiment of my invention, the numerals 1 and 2 designate the yoke sections of my so-called animal poke, and are provided with upwardly extending arms 3 and 4 which are held together by means of suitable fastening means 5. The yoke sections 1 and 2 are also provided with downwardly extending arms 6 and 7, and these downwardly extending arms 6 and 7 are held together by means of a suitable fastening means 8. The yoke sections together with their arms are so constructed as to provide the body portion thereof with an oval shaped opening 9 for the purpose of allowing the yoke sections to be placed around the neck of the animal when in use.

Pivotally mounted upon the fastening means 5 and between the upwardly extending arms 3 and 4 of the yoke sections 1 and 2 is an angular bar 10 which consists of an elongated shank 11 which tapers to a hook point 12 as shown in Fig. 2 of the drawings. A shorter section 13 is formed at an angle and at the opposite end of the elongated section 11 of the angle bar 10 and this short section 13 is provided with diverging prongs 14 which diverge from the opposite end thereof. The shorter section 13 is also adapted to be pivotally mounted upon suitable fastening means 5, so as to permit the shank 11 to normally maintain the position shown in full lines in Fig. 2 of the drawings.

The downwardly extending arms 6 and 7 of the yoke sections 1 and 2 are longer than the upwardly extending arms 3 and 4 of the yoke sections 1 and 2, and the downwardly extending arms 6 and 7 are provided with a series of registering apertures 15 for the purpose of allowing the yoke sections 1 and 2 to be opened or closed as seen fit when in use. The fastening means 8 is adapted to be placed in any of the apertures 15 formed in the downwardly extending arms, and also provides a means for pivotally supporting an angular bar 16 which is of the same construction as the angular bar 10 disclosed above. It is not thought necessary to describe the construction of this bar, for the reason that the angular bar 16 is identical with the angular bar 10 except for one feature of providing an aperture 17 at the juncture of a short section 18 and the elongated section 19 for the purpose of pivotally mounting the same upon the securing element 8.

The upwardly extending arms 3 and 4 of the yoke sections 1 and 2 are provided with angular extensions 20 and 21 respectively arranged in the same plane with their respective upper ends. It will be seen from Figure 3 that these angular extensions 20 and 21 lie parallel with the short end 13 of angle bar 10. As is obvious, these extensions are arranged in planes on opposite sides of the bar 10 and the free end of each extension 20 and 21 is provided with an inwardly extending portion numbered 22 for the arm 20 and 23 for the arm 21. It will also be noted that these inwardly extending portions 22 and 23 are arranged above the short arm 13 of bar 10 and that extension 21 is shorter than extension 20 so that the inwardly extending portion 23 is arranged behind the long arm 11 of bar 10 and in proximity thereto so as to prevent excessive backward movement of arm 11 when it is engaged with a fence or other barrier. The inwardly extending portion 22 of part 20 is adapted to engage the top edge of the short arm 13 of bar 10 at all times except when the long arm 11 is engaged with a fence or other barrier and maintains this long arm 11 in proper position to engage a fence when the cattle attempts to break through the same.

Having thus described my invention what I claim is:—

1. A device of the character described comprising an animal receiving yoke, spaced oppositely extending horizontally disposed angular extensions carried by the upper end thereof, an angle bar pivoted to the upper end of the yoke and having a hook element formed at each end thereof, the legs of such angle bar being adapted to engage the adjacent angular extension when moved towards the latter and thereby limit the pivotal movement of the angle bar.

2. An animal yoke having a pair of parallel upwardly extending arms, an angle bar pivotally mounted between said arms, said angle bar consisting of an elongated section, a shorter section carried by one end of the elongated section and provided with a prong, the upwardly extending arms provided with angular extensions arranged in parallel planes and extending in opposite directions, inwardly extending portions carried by the ends of said angular extensions, one of said inwardly extending portions adapted to engage the top edge of the shorter section and the rear edge of the other inwardly extending portion adapted to engage the elongated section of the angle bar for the purpose of limiting the movement of the angle bar in either direction.

3. An animal poke of the class described, comprising a member adapted to fit upon the neck of an animal, an L-shaped bar pivotally connected to said member, said member comprising an elongated arm and an angularly disposed shorter arm, and abutment means carried by said neck member for engagement with the arms of the L-shaped bar for limiting movement thereof in either direction.

4. An animal poke comprising a member adapted to fit upon the neck of an animal, a substantially L-shaped bar pivotally connected to said member and including a relatively long arm and a relatively short arm, said shorter arm terminating in a prodding point, angular extensions carried by said neck member terminating in inwardly extending portions, one adapted for engagement with the relatively long arm to limit movement of the bar in one direction, and the other inwardly extending portion adapted for engagement with the relatively short arm of the bar to limit movement of the latter in the other direction.

In testimony whereof I affix my signature.

TED H. PHILLIPS.